(12) United States Patent
Guo et al.

(10) Patent No.: US 12,411,208 B2
(45) Date of Patent: Sep. 9, 2025

(54) COHERENT MICROWAVE PHOTONICS RADAR DETECTION METHOD AND SYSTEM BASED ON INJECTION LOCKING FREQUENCY MULTIPLICATION

(71) Applicant: ZHEJIANG LAB, Zhejiang (CN)

(72) Inventors: Qingshui Guo, Hangzhou (CN); Kun Yin, Hangzhou (CN); Chen Ji, Hangzhou (CN); Jihou Wang, Hangzhou (CN); Xiaojun Ying, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 448 days.

(21) Appl. No.: 18/088,743

(22) Filed: Dec. 26, 2022

(65) Prior Publication Data

US 2023/0136882 A1 May 4, 2023

Related U.S. Application Data

(63) Continuation of application No. PCT/CN2021/126522, filed on Oct. 26, 2021.

(30) Foreign Application Priority Data

Jul. 7, 2021 (CN) .......................... 202110765357.9

(51) Int. Cl.
  *G01S 13/34* (2006.01)
  *G01S 7/35* (2006.01)
  *G01S 13/02* (2006.01)
(52) U.S. Cl.
  CPC .......... *G01S 7/354* (2013.01); *G01S 13/0209* (2013.01); *G01S 13/34* (2013.01)
(58) Field of Classification Search
  CPC ....... G01S 7/354; G01S 13/0209; G01S 13/34
  See application file for complete search history.

(56) References Cited

U.S. PATENT DOCUMENTS

| 2012/0002972 A1* | 1/2012 | Stiffler | H04B 10/5165 |
| | | | 398/115 |
| 2014/0270783 A1 | 9/2014 | Prather et al. | |
| 2016/0123718 A1* | 5/2016 | Roos | G01B 9/02004 |
| | | | 356/498 |

FOREIGN PATENT DOCUMENTS

| CN | 102792614 A | 11/2012 |
| CN | 108761398 A | 11/2018 |

(Continued)

OTHER PUBLICATIONS

CN First Office Action(202110765357.9); Date of Mailing: Aug. 23, 2021.

*Primary Examiner* — Kenneth N Vanderpuye
*Assistant Examiner* — Asif Shameem
(74) *Attorney, Agent, or Firm* — Wiersch Law Group

(57) ABSTRACT

Discloses a coherent microwave photonics radar detection method and system based on injection locking frequency multiplication. The method uses a baseband signal to modulate an optical carrier to generate a modulated optical signal including a plurality of high-order sidebands; the modulated optical signal is divided into two paths which are respectively injected into two slave lasers for high-order sideband injection locking to obtain two locked sideband optical signals; Based on combining and splitting two locked sideband optical signals, the radar transmitting signal and receiving optical signal can be obtained through photodetection and electro-optic modulation. After coherent detection of receiving optical signal, obtaining the intermediate frequency signal, and detection target information can be extracted from intermediate frequency signal by radar algorithm.

7 Claims, 2 Drawing Sheets

(56) References Cited

FOREIGN PATENT DOCUMENTS

| | | | |
|---|---|---|---|
| CN | 108802698 | A | 11/2018 |
| CN | 109375201 | A | 2/2019 |
| CN | 109586167 | A | 4/2019 |
| CN | 110632597 | A | 12/2019 |
| CN | 111175780 | A | 5/2020 |
| CN | 111478176 | A | 7/2020 |
| CN | 111538028 | A | 8/2020 |
| CN | 111751827 | A | 10/2020 |
| CN | 112099048 | A | 12/2020 |
| CN | 113253286 | A | 8/2021 |

\* cited by examiner

COHERENT MICROWAVE PHOTONICS RADAR DETECTION METHOD AND SYSTEM BASED ON INJECTION LOCKING FREQUENCY MULTIPLICATION

CROSS-REFERENCE TO RELATED APPLICATIONS

The present application is a continuation of International Application No. PCT/CN2021/126522, filed on Oct. 26, 2021, which claims priority to Chinese Application No. 202110765357.9, filed on Jul. 7, 2021, the contents of both of which are incorporated herein by reference in their entireties.

TECHNICAL FIELD

The present application relates to a radar detection method, in particular to a microwave photonics radar detection method and system based on optical injection locking frequency multiplication and coherent receiving.

BACKGROUND

Real-time high-resolution radar is widely used in military and civil fields, and multi-functional full-spectrum detection is one of the main directions of the development of modern radar technology. In order to cover the broadband spectrum space, it is necessary that the radar working band is flexible and adjustable, and the signal can be processed and analyzed in real time with high precision. Limited by the bottleneck of the current electronic technology, there are potential of amplitude/phase nonlinear effects in RF amplification, matching and transmission links when they carry the functions of broadband signal generation, sampling and processing, which limits the development status of radar to a high-frequency broadband direction (see [S. Kim, N. Myung, "Wideband linear frequency modulated waveform compensation using system predistortion and phase coefficients extraction method," *IEEE Microwave and Wireless Components Letters*, vol. 17, no. 11, pp. 808-810, 2007.]). Thanks to the rapid development of microwave photonics technology, the optical domain generation, transmission and processing of microwave signals, such as optical frequency mixing, optical sampling, optical true time delay and so on, provide new technical support for overcoming the electronic bottleneck of the traditional radar and improving technical performance, and become the key technology of the next generation radar (see [J. Mckinney, "Photonics illuminates the future of radar," *Nature*, vol. 507, no. 7492, pp. 310-312, 2014.]). Technologies such as broadband radar detection signal generation based on optical frequency multiplication technology and broadband radar echo signal real-time receiving and processing based on optical mixing technology have been used in new radar receiving technologies (see [F. Zhang, Q. Guo, Z. Wang, etc, "Photonics-based broadband radar for high-resolution and real-time inverse synthetic aperture imaging," *Optics Express*, vol. 25, no. 14, pp. 16274-16281, 2017.]). However, the current solution of broadband radar signal generation based on the optical frequency multiplication technology has the following problems: 1) the frequency multiplication factor of optical frequency multiplication based on a special modulator is limited and cannot be flexibly adjusted; 2) the photoelectric control link is complex, and there are parasitic interference signals generated by strong non-ideal sideband beat frequency; 3) the method of signal generation has the limitation that most radar signal receiving solutions are difficult to receive broadband target echo signals through coherent receiving.

SUMMARY

The technical problem to be solved by the present application is that: to overcome the shortcomings of the prior art, based on the optical injection locking mechanism, a distributed feedback laser is used to filter and amplify the high-order swept sidebands, and a broadband radar transmission signal with flexible and adjustable frequency multiplication factor is obtained; based on coherent receiving technology, real-time orthogonal de-chirping of a broadband echo signal is realized. The system is flexible and adjustable with excellent anti-interference performance.

The present application specifically adopts the following technical solution to solve the technical problems:

Modulating an optical carrier $f_C$, output by a master laser through an electro-optic modulator by using a baseband linear frequency modulation (LFM) signal with a frequency of $f_{LFM}$ to obtain a modulated optical signal containing some high-order modulation sideband $f_C \pm n f_{LFM}$, where n is a positive integer; dividing the modulated optical signal into two paths, then, injecting into two slave lasers respectively for high-order sideband injection locking, and the two slave lasers outputting a first amplified locked sideband $f_C - M f_{LFM}$ optical signal and a second amplified locked sideband $f_C + N f_{LFM}$ optical signal, respectively, where M and N are positive integers; selecting one locked sideband optical signal to divide into two paths, one path being combined with the other amplified locked sideband optical signal to form a radar detection optical signal, and the other path serving as a receiving optical signal to receive a radar echo signal to obtain a radar receiving optical signal; dividing the radar detection optical signal into two paths, one of which being subjected to photoelectric conversion to obtain a frequency multiplication radar transmitting signal (M+N)$f_{LFM}$, and the frequency multiplication radar transmitting signal being reflected from target is set as the radar echo signal; the other path of the radar detection optical signals serving as a reference optical signal to achieve coherent receiving of the radar echo signal together with the radar receiving optical signal, so as to obtain a complex intermediate frequency signal carrying target information, and processing the intermediate frequency signal to extract detection target information.

In an embodiment, the slave laser is a distributed feedback laser, which can filter and amplify the modulation sideband close to its working frequency. The free working frequency of the slave laser must meet certain conditions, a free working frequency $f_{SL1}$ of the first slave laser whose frequency is close to the sideband $f_C - M f_{LFM}$ is required to satisfy:

$$-f_{d1}\sqrt{\frac{I_{11}}{I_{01}}}(1+\alpha_1^2) < f_C - M f_{LFM} - f_{SL1} < f_{d1}\sqrt{\frac{I_{11}}{I_{01}}}$$

where $f_{d1}$ is a mode interval of the first slave laser, $I_{11}$ is an optical injection power of the first slave laser, $I_{01}$ is an output power of the first slave laser, and $\alpha_1$ is a linewidth enhancement factor related to the first slave laser; a free working frequency $f_{SL2}$ of the second slave laser whose frequency is close to the sideband $f_C + N f_{LFM}$ is required to satisfy:

$$-f_{d2}\sqrt{\frac{I_{12}}{I_{02}}}(1+\alpha_2^2) < f_C + Nf_{LFM} - f_{SL2} < f_{d2}\sqrt{\frac{I_{12}}{I_{02}}}$$

where $f_{d2}$ is a mode interval of the second slave laser, $I_{12}$ is an optical injection power of the second slave laser, $I_{02}$ is an output power of the second slave laser, and $\alpha_2$ is a linewidth enhancement factor related to the second slave laser.

Furthermore, different sidebands of the modulated optical signal are selectively locked and amplified by controlling the free working wavelengths, optical injection powers and output powers of the two slave lasers; so as to realize a different frequency multiplication factor M+N (M and N are positive integers) of the radar transmitting signal relative to the baseband LFM signal.

According to the same inventive idea, the following technical solution can also be obtained:

A coherent microwave photonics radar detection system based on injection locking frequency multiplication, including:

A master laser configured to generate an optical carrier signal $f_C$.

A signal source configured to generate a baseband LFM signal with a frequency of $f_{LFM}$.

A first electro-optic modulator configured to modulate the baseband LFM signal to the optical carrier signal to obtain a modulated optical signal containing the high-order modulation sideband $f_C \pm nf_{LFM}$ (n is a positive integer).

A first optical coupler configured to divide the modulated optical signal into two paths.

Two slave lasers configured to receive the two paths of the modulated optical signal output by the first optical coupler respectively, and filter, lock and amplify a specific sideband of the modulated optical signal to obtain a first amplified locked sideband signal $f_C - Mf_{LFM}$ and a second amplified locked sideband signal $f_C + Nf_{LFM}$, where M and N are positive integers.

A third optical coupler configured to divide the second amplified locked sideband signal $f_C + Nf_{LFM}$ into two paths and send the two paths to the second electro-optic modulator and the second optical coupler, respectively.

A second optical coupler configured to combine the first amplified locked sideband signal $f_C - Mf_{LFM}$ and the second amplified locked sideband signal $f_C + Nf_{LFM}$ output by the third optical coupler into a radar detection optical signal, which is then divided into two paths to be sent to a 90-degree optical coupler and a photodetector, respectively.

The photodetector configured to carry out photoelectric detection on the radar detection optical signal to obtain a frequency multiplication radar transmitting signal.

A power amplifier and a transmitting antenna configured to perform power amplification and signal transmission for the frequency multiplication radar transmitting signal.

A receiving antenna and a low noise amplifier configured to receive the radar echo signal and perform low noise amplification.

A second electro-optic modulator configured to modulate one path of the amplified locked sideband signal output by the third optical coupler using the radar echo signal to obtain the radar receiving optical signal, and send the radar receiving optical signal to the 90-degree optical coupler.

The 90-degree optical coupler configured to introduce a 90-degree phase difference between the input radar detection optical signal and the radar receiving optical signal in the optical domain, and output four paths of composite optical signals.

Two balanced photodetectors configured to respectively carry out photoelectric detection on the four paths of optical signals output by the 90-degree optical coupler to obtain two paths of orthogonal intermediate frequency signals carrying target information.

A signal acquisition and processing module configured to perform analog-to-digital conversion for the two paths of orthogonal intermediate frequency signals, and perform radar digital signal processing to extract the target information.

Furthermore, the slave laser is a distributed feedback laser; the first electro-optic modulator and the second electro-optic modulator are Mach-Zehnder modulator, intensity modulator or phase modulator, respectively.

Furthermore, the system further includes a control unit, the control unit sends out a control signal to make the first slave laser and the second slave laser work in the working state with a set locked high-order sideband, respectively, so as to obtain a set frequency multiplication factor M+N, where M and N are positive integers.

Furthermore, the system further includes two optical circulators, the first port of the first optical circulator is connected with an output port of the first optical coupler, the second port is connected with the input port of the first slave laser, and the third port is connected with an input port of the second optical coupler, for injecting the modulated optical signal output by the first optical coupler into the first slave laser, and sending the amplified locked sideband signal output by the first slave laser to the second optical coupler; the first port of the second optical circulator is connected with the other output port of the first optical coupler, the second port is connected with the input port of the second slave laser, and the third port is connected with the input port of the third optical coupler, for injecting another path of the modulated optical signal output by the first optical coupler into the second slave laser, and sending the amplified locked sideband signal output by the second slave laser to the third optical coupler.

Compared with that prior art, the technical solution of the present application has the following beneficial effects.

1) The signal generation part of the present application filters and amplifies different high-order sidebands of modulated optical signals based on optical injection locking, which can realize the generation of broadband radar detection signals with different frequency multiplication factors, and the frequency multiplication factors can be flexibly adjusted by adjusting the working parameters of slave lasers, so that the radar system can be flexibly switched between different working bands.

2) In the signal receiving part of the present application, an amplified locked sideband signal is used as the optical carrier to receive a radar echo signal, and combined with the optical reference signal, the real-time orthogonal de-chirping processing of the broadband radar echo signal is realized in the photoelectric domain, which can effectively suppress noise and image frequency interference signals, and can avoid the signal performance deterioration caused by the problem of amplitude/phase inconsistency in the electric domain.

3) In the signal generation part of the present application, the high-order sidebands of the modulated optical signal inherit the advantages of high linearity of the baseband LFM signal, and the phase relationship between different sidebands is fixed, and the characteristics of the injecting signal are still inherited after the different sidebands are filtered and amplified by the slave lasers, so that the linearity, signal-to-noise ratio and other performances of the frequency multiplication radar detection signal can be guaranteed.

Figure 1:
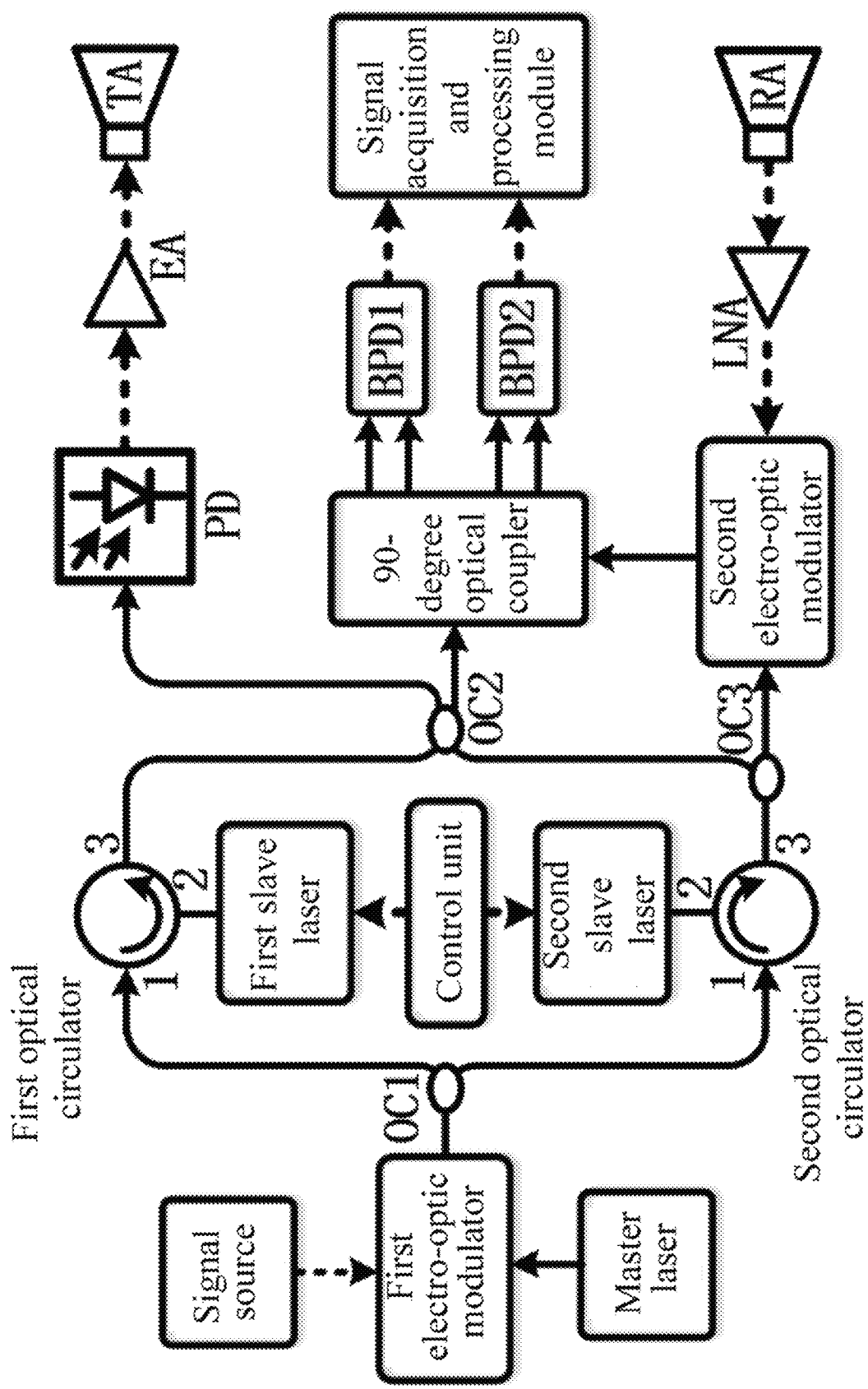
FIG. 1 is a schematic diagram of the microwave photonics radar system of the present application.

In the drawings, A corresponds to the spectrum distribution of a modulated optical signal, B corresponds to the working frequency of the first slave laser 1 and the spectrum distribution of output amplified locked sideband signal, C corresponds to the working frequency of second slave laser 2 and the spectrum distribution of output amplified locked sideband signal, D corresponds to the spectrum distribution of two amplified locked sideband optical signals combined into one radar detection optical signal, E corresponds to the spectrum distribution of some areas of radar receiving optical signals, F corresponds to the spectrum of a radar detection optical signal and a radar receiving optical signal input to a balanced detector, and G corresponds to the spectrum of the complex form of the intermediate frequency signal.

DESCRIPTION OF EMBODIMENTS

In view of the shortcomings of the prior art, the idea of the present application is to generate broadband, high-frequency and tunable linear frequency modulation (LFM) radar transmitting signals based on optical injection locking different high-order sideband signals, and realize coherent receiving of broadband echo signals by an optical coherent receiving method. The radar working parameters of this solution are flexible and adjustable, the signal processing is real-time and efficient, and the anti-interference ability is excellent.

A coherent microwave photonics radar detection system based on injection locking frequency multiplication. of the present application, as shown in FIG. 1, includes: a master laser, a signal source, two electro-optic modulators, two optical circulators, two slave lasers, three optical couplers (OC), a control unit, a high-frequency photodetector (PD), a 90-degree optical coupler, two balanced photodetectors (BPD), an electric power amplifier (EA), a low noise amplifier (LNA), a transmitting antenna (TA), a receiving antenna (RA) and a signal acquisition and processing module.

It should be noted that the electro-optic modulator can adopt a variety of modulator types, and preferably, an intensity modulator solution is selected in this embodiment.

Figure 2:
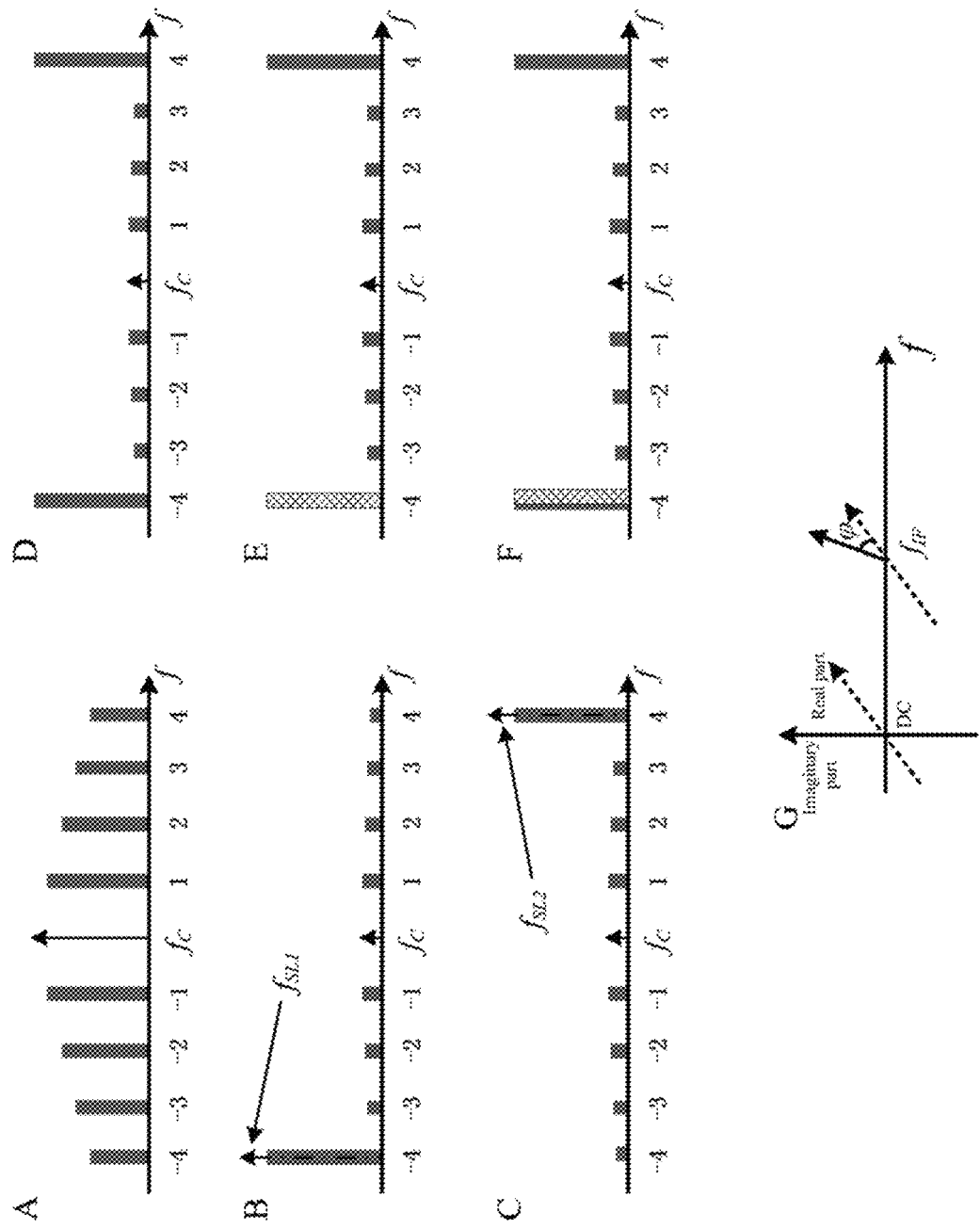
FIG. 2 is the schematic diagram of the signal spectrum and the signal generated at corresponding nodes in the microwave photonics radar system shown in FIG. 1.

According to the coherent microwave photonics radar detection system of the present application, first, a master laser outputs an optical carrier signal with a frequency of $f_C$, and a baseband LFM signal with a frequency of $f_{LFM}=f_0+kt(0 \leq t \leq T)$ generated by a signal source intensity modulating optical carrier signal through the first electro-optic modulator to obtain a modulated optical signal containing some high-order modulation sideband $f_C \pm nf_{LFM}$ (n is a positive integer), as shown in FIG. 2A, where $f_0$ is the initial frequency of the baseband LFM signal, and k is a frequency modulation slope, and T is a signal period. The modulated optical signal is divided into two parts by the first optical coupler, which are sent to the first port 1 of the first optical circulator and the second optical circulator respectively (the input of the first port 1 of the first optical circulator is output from the second port 2, and the input of the second port 2 is output from the third port 3); the optical port of the first slave laser is connected to the second port 2 of the first optical circulator, and its free working frequency $f_{SL1}$ is close to a modulation sideband of the modulated optical signal. Here, it is assumed to be a −4-order sideband, so the first slave laser performs locked filtering and amplification on the −4-order sideband of the modulated optical signal through the first optical circulator, and the first slave laser outputs the first amplified locked sideband $f_C-4f_{LFM}$ signal, and its spectrum diagram is shown in B of FIG. 2. Similarly, the optical port of the second slave laser is connected to the second port 2 of the second optical circulator, and its free working frequency $f_{SL2}$ is close to the other modulation sideband of the modulated optical signal. Here, assuming that it is a +4-order sideband, the second slave laser performs locked filtering and amplification on the +4-order sideband of the modulated optical signal through the second optical circulator, and the second slave laser outputs the second amplified locked sideband $f_C+4f_{LFM}$ signal, and its spectrum diagram is shown in C of FIG. 2.

One of the locked sideband optical signals (taking the second amplified locked sideband as an example) is divided into two paths through the third optical coupler, and one of two paths is selected as the receiving optical signal to receive the radar echo signal, and the other path and the first amplified locked sideband optical signal are combined into one radar detection optical signal through the second optical coupler; its frequency spectrum diagram is shown in D of FIG. 2, and the time domain signal can be expressed as:

$$S_{Tr}(t) = A_1 \exp[j2\pi(f_C-4(f_0+kt))t] + A_2 \exp[j2\pi(f_C+4(f_0+kt))t] (0 \leq t \leq T) \quad (1)$$

where $A_1$ and $A_2$ are the electric field amplitudes of the two locked sidebands, respectively. The signal is divided into two parts, one of which is used as a reference optical signal and sent to a 90-degree optical coupler, and the other is photoelectric detected by a photodetector to obtain a frequency multiplication radar transmitting signal with an instantaneous frequency of 8 $f_{LFM}$, the signal is amplified by an electric power amplifier (EA) and then transmitted by a transmitting antenna (TA). After a target echo signal is received by the receiving antenna (RA), it is sent to the low noise amplifier for amplification, and the time delay of the radar echo signal relative to the radar transmitting signal is assumed to be τ. The amplified radar echo signal modulates another second amplified locked sideband optical signal through the second electro-optic modulator, so as to realize the optical domain receiving of the radar echo signal. Considering that only the negative first-order signal of the second amplified locked sideband optical signal is close to the first amplified locked sideband optical signal, and has a frequency difference of intermediate frequency signal related to the target information, therefore the negative first-order signal is mainly analyzed below. The spectrum distribution of the optical signal including the second amplified locked sideband and its negative first-order modulation sideband is shown in E of FIG. 2, and the time domain signal can be expressed as:

$$S_{Re}(t) = A_3 \exp[j2\pi(f_C - 4(f_0 + k(t-\tau)))(t-\tau)] + \\ A_4 \exp[j2\pi(f_C + 4(f_0 + kt))t] (0 \leq t \leq T) \quad (2)$$

where $A_3$ and $A_4$ are the electric field amplitudes of the two sidebands respectively. This signal is sent to the 90-degree optical coupler to realize the optical domain phase shift of coherent receiving with the reference optical signal. The spectrogram of the radar detection optical signal and the radar receiving optical signal input to the balanced detector is shown in F of FIG. 2, and the output signal of the 90-degree optical coupler can be expressed as:

$$\begin{bmatrix} S_{I+}(t) \\ S_{I-}(t) \\ S_{Q+}(t) \\ S_{Q-}(t) \end{bmatrix} \propto \begin{bmatrix} 1 & 1 \\ 1 & -1 \\ 1 & j \\ 1 & -j \end{bmatrix} \times \begin{bmatrix} S_{Tr}(t) \\ S_{Re}(t) \end{bmatrix} = \begin{bmatrix} S_{Tr}(t) + S_{Re}(t) \\ S_{Tr}(t) - S_{Re}(t) \\ S_{Tr}(t) + jS_{Re}(t) \\ S_{Tr}(t) - jS_{Re}(t) \end{bmatrix} \quad (3)$$

$S_{I+}(t)$, $S_{I-}(t)$, $S_{Q+}(t)$ and $S_{Q-}(t)$ are four optical signals output by the 90-degree optical coupler, respectively. The four optical signals output by the 90-degree optical coupler are sent to two balanced photoelectric detectors to complete photoelectric conversion, parasitic phase are ignored, and the obtained intermediate frequency electrical signal can be expressed as:

$$\begin{bmatrix} S_I(t) \\ S_Q(t) \end{bmatrix} \propto \begin{bmatrix} |S_{I+}(t)|^2 - |S_{I-}(t)|^2 \\ |S_{Q+}(t)|^2 - |S_{Q-}(t)|^2 \end{bmatrix} \propto \begin{bmatrix} \cos(2\pi k\tau t + \varphi) \\ \sin(2\pi k\tau t + \varphi) \end{bmatrix} (0 \leq t \leq T) \quad (4)$$

It's two orthogonal components $S_I(t)$ and $S_Q(t)$ of that intermediate frequency signal carrying the target information, $\varphi$ is the phase information of the intermediate frequency signal, and the corresponding complex form of the signal is:

$$S_{IF}(t) = S_I(t) + jS_Q(t) = A\exp[j2\pi k\tau t + j\varphi](0 \leq t \leq T) \quad (5)$$

A is the amplitude of the intermediate frequency signal. After analog-to-digital conversion of the intermediate frequency signal, the target distance, velocity, scattering characteristics and other information can be obtained based on the radar signal processing algorithm, and its frequency spectrum is shown in G of FIG. 2.

In this solution, the optical injection locking technology is introduced into the transmitting part of the radar system. By changing the wavelength of the injected laser and other parameters, different high-order modulated sideband signals can be filtered and amplified, and a broadband radar signal with flexible and adjustable frequency multiplication factors can be generated. Based on the optical coherent receiving solution, a broadband receiving signal can be received coherently in real time, and a complex intermediate frequency signal can be obtained on the basis of ensuring the frequency multiplication capability of the system. Compared with the real intermediate frequency signal, it not only has more information in one dimension, but also has a stronger ability to resist image interference. The overall signal-to-noise ratio of the receiver can also be greatly improved.

Finally, it should be noted that the above examples are only specific embodiments of the present application. The present application is not limited to the above embodiments, and many variations are possible. All modifications that can be directly derived or associated by those skilled in the art from the disclosure of the present application should be regarded as the scope of protection of the present application.

What is claimed is:

1. A coherent microwave photonics radar detection method based on injection locking frequency multiplication, comprising the following steps of:
   modulating an optical carrier fc output by a master laser through an electro-optic modulator by using a baseband linear frequency modulation (LFM) signal with a frequency of $f_{LFM}$ to obtain a modulated optical signal containing a high-order modulation sideband $f_C \pm nf_{LFM}$, where n is a positive integer;
   dividing the modulated optical signal into two paths to be injected into two slave lasers respectively for high-order sideband injection locking, and outputting, by the two slave lasers, respectively, a first amplified locked sideband $f_C - Mf_{LFM}$ optical signal and a second amplified locked sideband $f_C + Nf_{LFM}$ optical signal, where M and N are positive integers;
   selecting one locked sideband optical signal to be divided into two paths, wherein one path is combined with the other amplified locked sideband optical signal to form a radar detection optical signal, and the other path serves as a receiving optical signal to receive a radar echo signal to obtain a radar receiving optical signal;
   dividing the radar detection optical signal into two paths, wherein one path is subjected to photoelectric conversion to obtain a frequency multiplication radar transmitting signal $(M+N)f_{LFM}$, and setting the frequency multiplication radar transmitting signal being reflected from target as the radar echo signal, and the other path serves as a reference optical signal to achieve coherent receiving of the radar echo signal together with the radar receiving optical signal, so as to obtain a complex intermediate frequency signal carrying target information; and
   processing the complex intermediate frequency signal to extract detection target information.

2. The method according to claim 1, wherein the slave laser is a distributed feedback laser, and a free working frequency $f_{SL1}$ of a first slave laser whose frequency is close to the sideband $f_C - Mf_{LFM}$ is required to satisfy:

$$-f_{d1}\sqrt{\frac{I_{11}}{I_{01}}}(1+\alpha_1^2) < f_C - Mf_{LFM} - f_{SL1} < f_{d1}\sqrt{\frac{I_{11}}{I_{01}}}$$

where $f_{d1}$ is a mode interval of the first slave laser, $I_{11}$ is an optical injection power of the first slave laser, $I_{01}$ is an output power of the first slave laser, and $\alpha_1$ is a linewidth enhancement factor related to the first slave laser; a free working frequency $f_{SL2}$ of a second slave laser whose frequency is close to the sideband $f_C + Nf_{LFM}$ is required to satisfy:

$$-f_{d2}\sqrt{\frac{I_{12}}{I_{02}}}(1+\alpha_2^2) < f_C + Nf_{LFM} - f_{SL2} < f_{d2}\sqrt{\frac{I_{12}}{I_{02}}}$$

where $f_{d2}$ is a mode interval of the second slave laser, $I_{12}$ is an optical injection power of the second slave laser, $I_{o2}$ is an output power of the second slave laser, and $\alpha_2$ is a linewidth enhancement factor related to the second slave laser.

3. The method according to claim 1, wherein different sidebands of the modulated optical signal are selectively locked and amplified by controlling free working wavelengths, optical injection powers and output powers of the two slave lasers, so as to realize a different frequency multiplication factor M+N of the radar transmitting signal relative to a baseband LFM signal.

4. A coherent microwave photonics radar detection system based on injection locking frequency multiplication, comprising:
   a master laser configured to generate an optical carrier signal fc;
   a signal source configured to generate a baseband linear frequency modulation (LFM) signal with a frequency of $f_{LFM}$;
   a first electro-optic modulator configured to modulate a baseband LFM signal to the optical carrier signal to obtain a modulated optical signal containing a high-order modulation sideband $f_C \pm nf_{LFM}$, where n is a positive integer;
   a first optical coupler configured to divide the modulated optical signal into two paths;
   two slave lasers configured to respectively receive the two paths of the modulated optical signal output by the first optical coupler, and filter, lock and amplify a specific sideband of the modulated optical signal to obtain a first amplified locked sideband signal $f_C - Mf_{LFM}$ and a second amplified locked sideband signal $f_C + Nf_{LFM}$, where M and N are positive integers;
   a second optical coupler configured to combine the first amplified locked sideband signal $f_C - Mf_{LFM}$ and the second amplified locked sideband signal $f_C + Nf_{LFM}$ output by a third optical coupler into a radar detection optical signal, which is then divided into two paths to be sent to a 90-degree optical coupler and a photoelectric detector, respectively;
   the third optical coupler configured to divide the second amplified locked sideband signal $f_C + Nf_{LFM}$ into two paths and send the two paths to a second electro-optic modulator and the second optical coupler, respectively;
   a photodetector configured to carry out photoelectric conversion on the radar detection optical signal to obtain a frequency multiplication radar transmitting signal;
   a power amplifier and a transmitting antenna configured to perform power amplification and signal transmission for the frequency multiplication radar transmitting signal;
   a receiving antenna and a low noise amplifier configured to receive a radar echo signal and perform low noise amplification;
   the second electro-optic modulator configured to modulate one path of an amplified locked sideband signal output by the third optical coupler using the radar echo signal to obtain a radar receiving optical signal and send the radar receiving optical signal to the 90-degree optical coupler;
   the 90-degree optical coupler configured to introduce a 90-degree phase difference between an input radar detection optical signal and the radar receiving optical signal in an optical domain, and output four paths of composite optical signals;
   two balanced photodetectors configured to respectively carry out photoelectric detection on the four paths of optical signals output by the 90-degree optical coupler to obtain two paths of orthogonal intermediate frequency signals carrying target information; and
   a signal acquisition and processing module configured to perform analog-to-digital conversion for the two paths of orthogonal intermediate frequency signals, and perform radar digital signal processing to extract the target information.

5. The system according to claim 4, wherein the slave laser is a distributed feedback laser; the first electro-optic modulator and the second electro-optic modulator are Mach-Zehnder modulator, intensity modulator or phase modulator, respectively.

6. The system according to claim 4, further comprising a control unit, wherein the control unit sends out a control signal to make a first slave laser and a second slave laser work in a working state with a set locked high-order sideband, respectively, so as to obtain a set frequency multiplication factor M+N, where M and N are positive integers.

7. The system according to claim 4, further comprising two optical circulators, wherein a first port of a first optical circulator is connected with an output port of the first optical coupler, a second port is connected with an input port of a first slave laser, and a third port is connected with an input port of the second optical coupler, for injecting the modulated optical signal output by the first optical coupler into the first slave laser and sending the amplified locked sideband signal output by the first slave laser to the second optical coupler; a first port of a second optical circulator is connected with the other output port of the first optical coupler, a second port is connected with an input port of a second slave laser, and a third port is connected with an input port of the third optical coupler, for injecting another path of the modulated optical signal output by the first optical coupler into the second slave laser and sending the amplified locked sideband signal output by the second slave laser to the third optical coupler.

\* \* \* \* \*